United States Patent [19]
Hsiao

[11] Patent Number: 6,138,729
[45] Date of Patent: Oct. 31, 2000

[54] SOLID TIRE INCLUDING INNER TIRE ASSEMBLY

[75] Inventor: Chai-I Hsiao, Chang-Hua Hsien, Taiwan

[73] Assignee: Taiwan Kings Glory Co., Ltd., Chang-Hua Hsien, Taiwan

[21] Appl. No.: 09/263,494

[22] Filed: Mar. 8, 1999

[51] Int. Cl.[7] .............................. B60C 7/12; B60C 7/10; B60C 7/00

[52] U.S. Cl. ........................................... 152/315; 152/322

[58] Field of Search ..................................... 152/320, 322, 152/302, 303, 310–316, 325, 327–329

[56] References Cited

U.S. PATENT DOCUMENTS 1,283,065  10/1918  Burgess .................................... 152/320

*Primary Examiner*—Adrienne C. Johnstone
*Attorney, Agent, or Firm*—Bacon & Thomas, PLLC

[57] ABSTRACT

A structural improvement of a solid tire is made up of a tire embodiment, an inner tire including a bottom layer, a middle layer and an upper layer. The bottom layer is a flat-topped curve-bottomed continual slab, the middle layer having an approximately rectangular cross section with top and bottom side thereof provided with axially parallel grooves and the right and left side defined in a smoothly curved surface. The upper layer is approximately in the same shape as the bottom layer but is additionally equipped with a humpbacked portion right on top of the curve-bottomed area. In assembly, the bottom layer is placed at the bottom of the tire embodiment and the middle layer is positioned next on top of the bottom layer, the upper layer is lastly placed on top of the middle layer. Such a structure makes the solid tire have a better buffer effect and lighter weight in use and the inner tire assembly can also be recycled for use after the tire embodiment is worn out. Besides, the inner tire is produced first independently and then put in the tire embodiment, so the tire embodiment is free of easy deterioration and aging as a result of secondary processing of the tire embodiment.

5 Claims, 5 Drawing Sheets

SOLID TIRE INCLUDING INNER TIRE ASSEMBLY

FIELD OF THE INVENTION

The present invention relates to a structural improvement of a solid tire which is made up of an outer tire and inner tire including a bottom layer, a middle layer and an upper layer. The bottom layer is a flat-topped curved-bottomed continuous layer, the middle layer has an approximately rectangular cross section with top and bottom sides thereof provided with axially parallel grooves and the right and left side thereof provided with smoothly curved surfaces. The upper layer is approximately in the same shape as the bottom layer but is additionally provided with a hump supporting protrusion on top of the upper layer. In assembling, the bottom layer is placed at the bottom of the outer tire and the middle layer is positioned on top of the bottom layer, the upper layer is placed on top of the middle layer. Such a structure makes the solid tire have a better buffer effect and lighter weight and the inner tire assembly can also be recycled for use after the outer tire is worn out. Besides, the inner tire assembly is produced separately and then put in the outer tire so the outer tire can be prevented from the deterioration and aging due to a secondary processing of the outer tire as required in the manufacturing of a conventional solid tire.

The improved solid tire of the present invention has an inner tire assembly having a number of layers which are easily assembled with a plurality of cushion chambers formed in the inner tire assembly, and the weight of the solid tire is effectively reduced, and furthermore it can offer better shock-absorbing effect. The outer tire is prevented from deterioration and aging due to secondary processing and the inner tire assembly can also be applied to ordinary tires having a conventional inner tire.

BACKGROUND OF THE INVENTION

As shown in FIGS. 1, 2, two conventional solid tires are illustrated. The prior art solid tire of the FIG. 1 is produced by placing raw rubber layer by layer on top of the other in a tire molding device and then is heated and pressed into shape.

Such a prior art solid tire has the following disadvantages:
1. The cross section of the solid tire is too large to be processed readily, and it is easily deformed in processing and it is relatively heavy in weight.
2. The solid tire made of hard rubber material is not good of absorbing shocks when used on bumpy roads, so it results in damage to the structure of a vehicle and the tire cracks after a long period of use. It is not comfortable and safe in use.

The second prior art solid tire (shown in FIG. 2) has an inner portion made of foamed rubber. It is made by firstly placing a rubber material and a foaming agent in an outer tire 10 and the mixture is subject to high temperature and pressure to form a foamed layer 20 adhered to the inner side of the outer tire 10.

Such a prior art solid tire with foamed inner portion has the following disadvantages in practical use:
1. The foaming process (addition of sulphur in the secondary processing) results in the aging of the outer tire 10 whose strength and resistance to wear are reduced accordingly, i.e. the operational life span is shortened.
2. Such a foamed inner tire portion can not stand heavy load, so the use of this solid tire is limited.
3. The foamed tire portion is easily deformed and peeled off, resulting in the shift of center gravity of the solid tire during rotation. This can cause driving hazards.

SUMMARY OF THE INVENTION

Therefore, the primary object of the present invention is to provide an improved structure of a solid tire which is equipped with a plurality of semi-circular axial grooves on its inner tire parts so as to permit cushion chambers to be formed inside the solid tire for effecting a better shock-absorbing effect. Such a structure enables the solid tire to be comfortably operated.

Another object of the present invention is to provide an improved solid tire which is equipped with a plurality of axially extended semi-circular grooves that can reduce the gross weight of a solid tire.

One further object of the present invention is to provide an improved solid tire which has an inner tire assembly directly made of rubber and housed inside a outer tire after its formation so as to avoid tire deterioration and oxidation due to further processing.

One still further object of the present invention is to provide an improved solid-tire which can also be applied to an ordinary tire having an inner tire so as to make its applicability relatively broader and easier.

One still further object of the present invention is to provide an improved solid tire having an inner tire, which is recyclable so as to effectively avoid environmental pollution.

BRIEF DESCRIPTION OF THE INVENTION

DETAILED DESCRIPTION OF THE PREFERRED EMBODIMENTS

Figure 1:
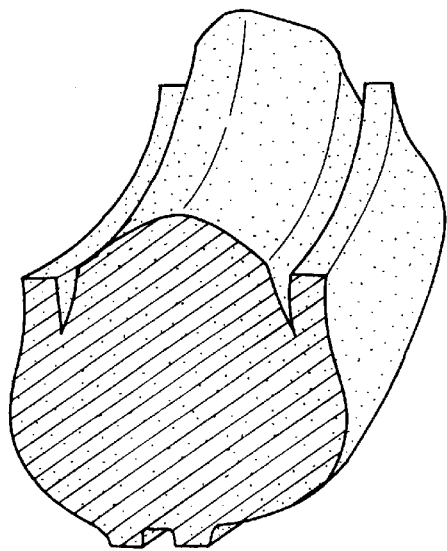
FIG. 1 is a diagram showing a sectional view of a conventional solid tire.
Figure 2:
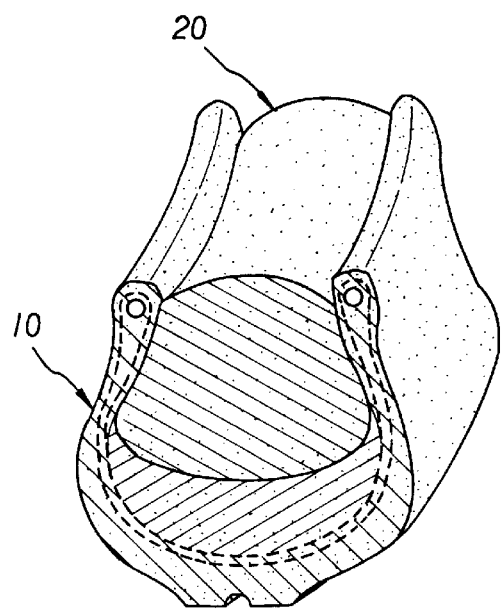
FIG. 2 is a diagram showing a sectional view of another conventional solid tire.
Figure 3:
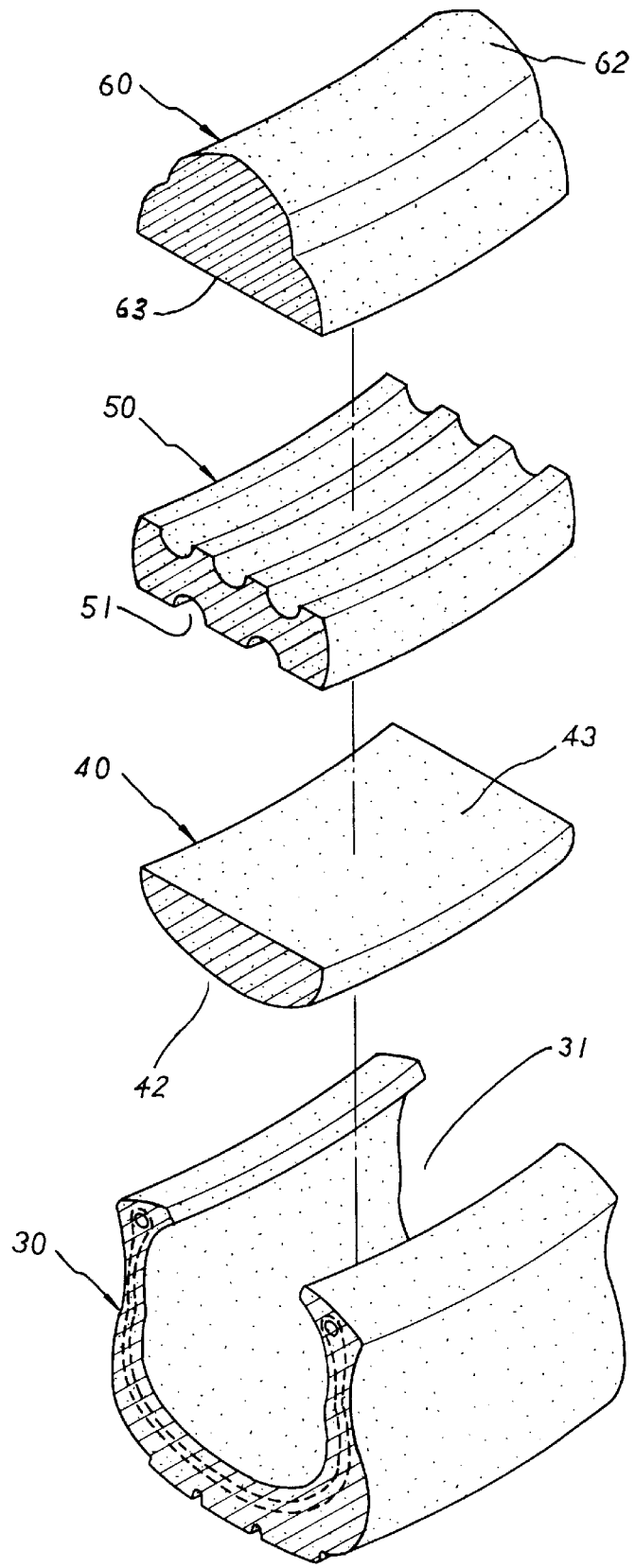
FIG. 3 is an exploded perspective view showing the components of the present invention.

Referring to FIG. 3, the improved solid tire of the present invention is comprised of an outer tire 30, and an inner tire assembly including a bottom layer 40, a middle layer 50 and an upper layer 60. The bottom layer 40 has a cross section having a flat top 43 and curved bottom 42 shaped in conformance with the curvature of an inner side of the outer tire 30. The middle layer 50 has an approximately rectangular cross section with two curved side edges and is provided with a plurality of axially extended semi-circular grooves 51 on the top and bottom surfaces thereof. The upper layer 60, having basically a shape similar to the bottom layer 40, has a flat bottom 63 and a humped supporting protrusion 62 on the top thereof.

Figure 4:
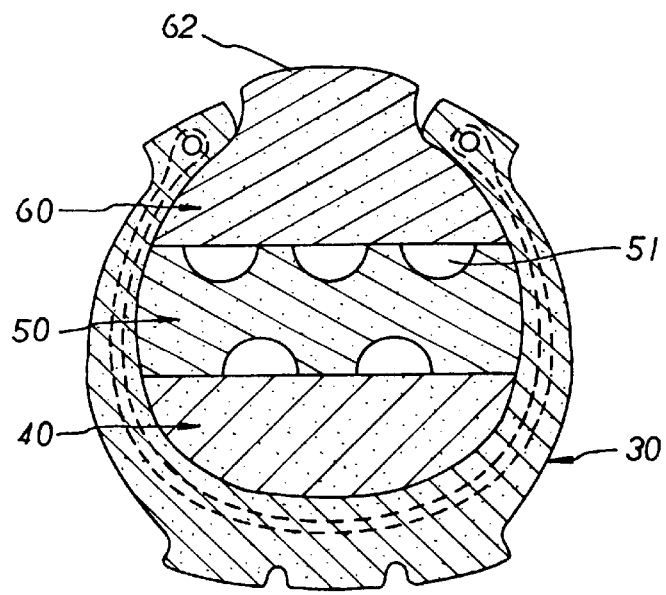
FIG. 4 is a sectional view showing the assembly of the present solid tire.
Figure 5:
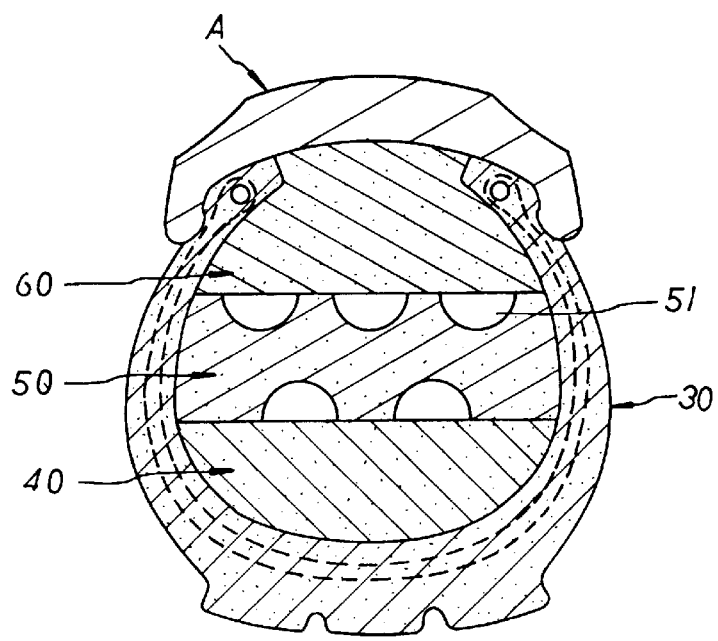
FIG. 5 is a sectional view showing the practical application of the solid tire thereof.

Referring to FIG. 4 and FIG. 5, the assembling of the solid tire is performed in the following way. The bottom layer 40 is placed at the bottom of the outer tire 30 and the middle layer 50 is positioned in the outer tire 30 and in close abutment to the bottom layer 40, and the upper layer 60 is also positioned in the outer tire 30 and located on top of the middle layer 50. Thereby, there are a plurality of flexible cushion chambers of semi-circular cross section because of the semi-circular grooves 51 on the top and bottom side of the middle layer 50. The humped supporting protrusion 62 of the upper layer 60 is employed to force the upper opening 31 of the outer tire 30 to expand outwardly. Thus, the assembling of the solid tire is completed. In mounting, the outer tire 30 is snapped into engagement with a wheel rim A of a vehicle, as shown in FIG. 5.

Figure 6:
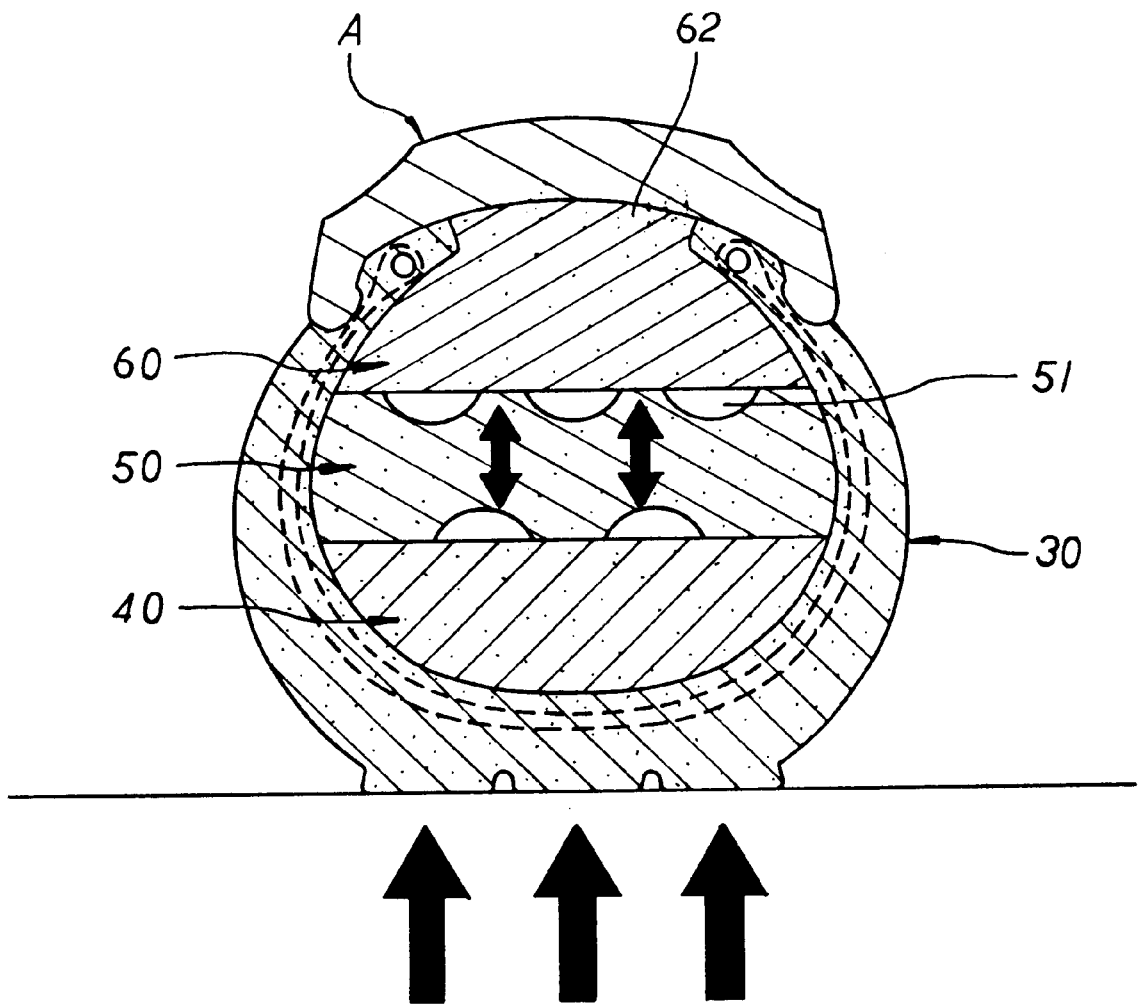
FIG. 6 is a diagram showing the solid tire of the present invention under pressure.

As shown in FIG. 6, as the solid tire of the present invention is subject to continual pressing forces on a bumpy road, the cushion chambers formed by the semi-circular grooves 51 can effectively absorb the shocks so as to obtain better shock proof effect and also to prevent the layers of the inner tire from relative sliding motion with respect to each other.

Figure 7:
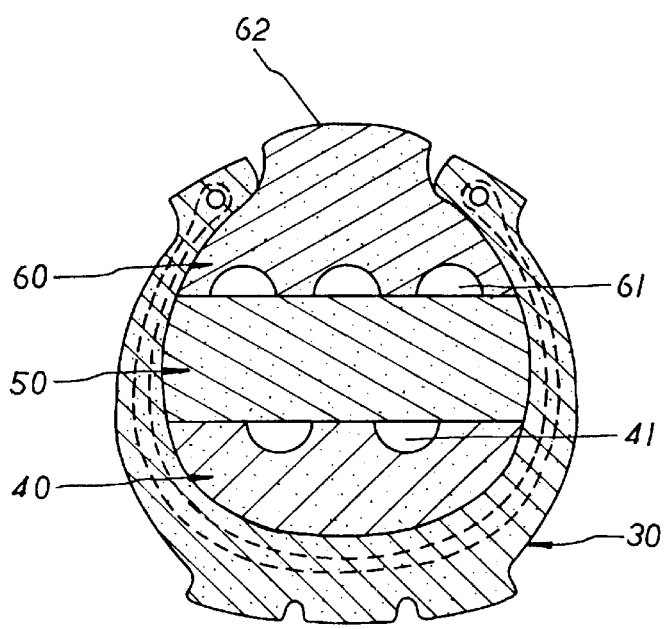
FIG. 7 is a sectional view showing another embodiment of the present invention.

Referring to FIG. 7, another embodiment of the present invention is shown. The middle layer 50 can be provided with no axial groove at all. Grooves 41 and grooves 61 can be provided on the flat top face of the bottom layer 40 and the flat bottom face of upper layer 60 respectively. The grooves 41 on the bottom layer 40 and grooves 61 on the upper layer 60 are not linearly aligned with each other but located in an alternating manner so as to form a plurality of cushion chambers which can produce the same shock absorbing and sliding proof effect as that in the first embodiment.

Figure 8:
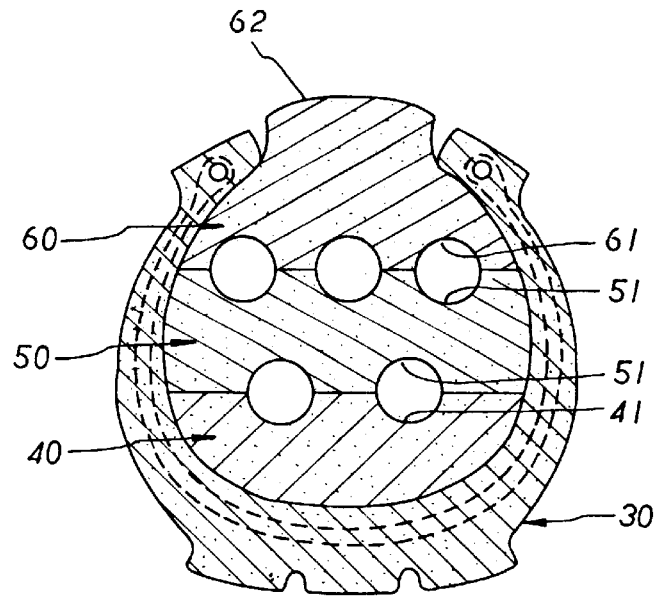
FIG. 8 is a sectional view showing one further embodiment of the present invention.

Referring to FIG. 8, one further embodiment of the present invention is illustrated. The flat surface of the bottom layer 40 is provided with a plurality of axially extended grooves 41 which are in alignment with grooves 51 provided on the bottom side of the middle layer 50. The flat surface 63 of the upper layer 60 is also provided with a plurality of axially extended grooves 61 in alignment with grooves 51 defined on the top side of the middle layer 50 whereby a plurality of circular tunnel-shaped cushion chambers are formed to provide better sliding proof effect and shock absorbing capability. Moreover, the inner tire assembly can be made of low density rubber material to make the solid tire lighter in weight.

In summary, the improved solid tires of various embodiments of the present invention have the following advantages:

1. The grooves 41, 51 and 61 on the bottom layer 40, middle layer 50 and upper layer 60 make the solid tire have a better shock absorbing and sliding proof capacity.
2. The solid tire of the present invention is lighter than a conventional solid tire because the provision of the grooves 41, 51 and 61.
3. The inner tire assembly is made directly of rubber material and housed in the outer tire 30 without further processing, thus the deterioration and aging due to secondary processing can be mitigated.
4. The inner tire assembly can be mounted onto a conventional tire, making the application of the present invention relatively versatile.
5. The inner tire assembly can be readily recycled when the outer tire is worn out.

What is claimed is:

1. An improved solid tire, comprising:
   an outer tire, and an inner tire assembly including a bottom layer, a middle layer and an upper layer;
   said outertire having an opening permitting said inner tire assembly to be stuffed therein;
   said bottom layer being provided with a flat top and a curved bottom shaped in conformance with the curvature of an inner side of said outer tire so as to permit said bottom layer to be accommodated in said outer tire;
   said middle layer having an approximately rectangular cross section with two curved side edges and a flat top and a flat bottom side;
   said upper layer having a flat bottom and a curved top, a structure similar to said bottom layer but having a humped supporting protrusion provided in the curved top for registration with said opening of the outer tire; and
   a plurality of axially extended grooves being provided on the flat top of the bottom layer and the flat bottom of the top layer, said grooves on said flat top and said flat bottom being not disposed in alignment with each other but positioned in an alternating manner;
   wherein said bottom layer, said middle layer and said upper layer are placed consecutively inside the outer tire, with said layers in close abutment with each other so as to permit said grooves on said top layer and said bottom layer to form cushion chambers which serve as buffers to absorb shocks, the gross weight of said solid tire is thus reduced due to the provision of the grooves, and said outer tire can be protected from deterioration and aging because no secondary processing is required after the solid tire is assembled.

2. An improved solid tire, comprising:
   an outer tire and an inner tire assembly including a bottom layer, a middle layer and an upper layer;
   said outer tire having an opening permitting said inner tire assembly to be stuffed therein;
   said bottom layer being provided with a flat top and a curved bottom shaped in conformance with the curvature of an inner side of said outer tire so as to permit said bottom layer to be accommodated in said outer tire;
   said middle layer having an approximately rectangular cross section with two curved side edges; on a top and bottom side of said middle layer being provided with a plurality of axially extended grooves, said grooves on said top side and grooves on said bottom side being positioned substantially in an alternating manner; and
   said upper layer having a flat bottom and a curved top, a structure similar to said bottom layer but having a humped supporting protrusion provided on the curved top for registration with said opening of said outer tire;
   whereby said bottom layer, said middle layer and said upper layer are placed consecutively inside said outer tire with said layers in close abutment with each other so as to permit said grooves on said middle layer to form cushion chambers which serve as buffers to absorb shocks, the gross weight of said solid tire is thus reduced due to the provision of the grooves, and the outer tire can be protected from deterioration and aging because no secondary processing is required after the solid tire is assembled.

3. The improved solid tire as claimed in claim 2 wherein said upper layer and bottom layer are provided with grooves on said flat sides respectively that are disposed in alignment with said grooves disposed on said top and bottom sides of said middle layer respectively so as to form tunnel-shaped cushion chambers to absorb shocks in operation.

4. The improved solid tire as claimed in claim 2 wherein said inner tire assembly is made of relatively lower density rubber material.

5. The improved solid tire as claimed in claim 2 wherein said axially extended grooves are in a shape of a semi-circular cross section.

* * * * *